(12) United States Patent
Fatemi et al.

(10) Patent No.: US 12,132,428 B2
(45) Date of Patent: Oct. 29, 2024

(54) ATTENUATION OF INDUCED MOTOR CURRENTS

(71) Applicant: GM Global Technology Operations LLC, Detroit, MI (US)

(72) Inventors: Alireza Fatemi, Canton, MI (US); William T. Ivan, Shelby Township, MI (US); Timothy J. Reinhart, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 17/885,733

(22) Filed: Aug. 11, 2022

(65) Prior Publication Data
US 2024/0056012 A1    Feb. 15, 2024

(51) Int. Cl.
| | | |
|---|---|---|
| *H02M 1/12* | (2006.01) | |
| *B60L 50/51* | (2019.01) | |
| *H02K 3/28* | (2006.01) | |
| *H02K 3/46* | (2006.01) | |
| *H02P 25/22* | (2006.01) | |
| *H02P 27/06* | (2006.01) | |

(52) U.S. Cl.
CPC .............. *H02P 25/22* (2013.01); *B60L 50/51* (2019.02); *H02K 3/28* (2013.01); *H02K 3/46* (2013.01); *H02P 27/06* (2013.01); *B60L 2210/40* (2013.01); *B60L 2220/50* (2013.01); *H02K 2203/09* (2013.01)

(58) Field of Classification Search
CPC ........... H02P 25/22; H02P 27/06; H02K 3/28; H02K 3/46; H02K 2203/09; H02K 11/0141; H02K 11/02
See application file for complete search history.

(56) References Cited

U.S. PATENT DOCUMENTS

2006/0071622 A1* 4/2006 Townsend .............. H02K 11/05
                                                                318/400.31
2009/0115271 A1* 5/2009 Takahashi .............. H02K 21/48
                                                                310/71
2019/0273429 A1* 9/2019 Li ........................... H02P 29/50

* cited by examiner

*Primary Examiner* — Muhammad S Islam
(74) *Attorney, Agent, or Firm* — CANTOR COLBURN LLP

(57) ABSTRACT

Induced currents in a multi-phase AC motor may be attenuated by operating the multi-phase AC motor with an AC choke surrounding an AC bus providing multi-phase AC voltage to multi-phase AC stator windings in a stator, wherein the AC choke may include an effective bandwidth at least covering resonant frequencies of a capacitance between the multi-phase AC stator windings and the stator or a frame of the AC motor.

20 Claims, 6 Drawing Sheets

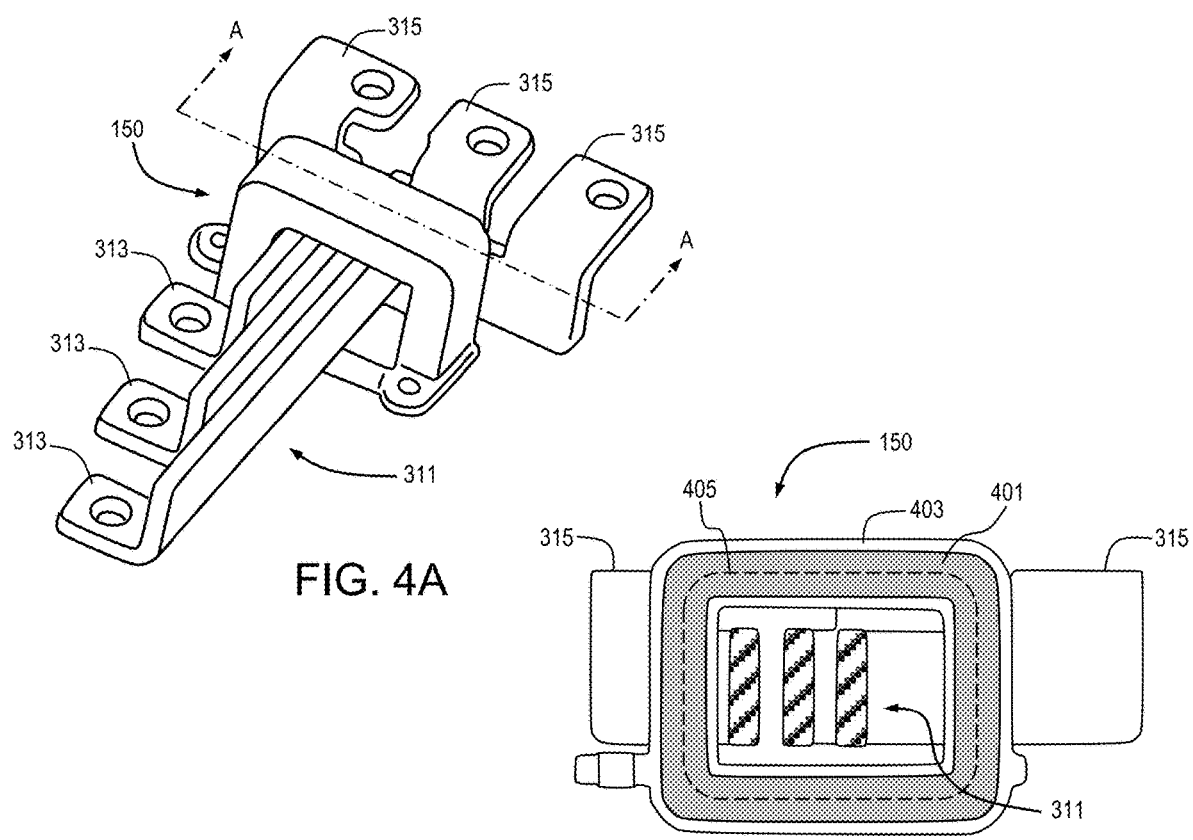
FIG. 4A
FIG. 4B
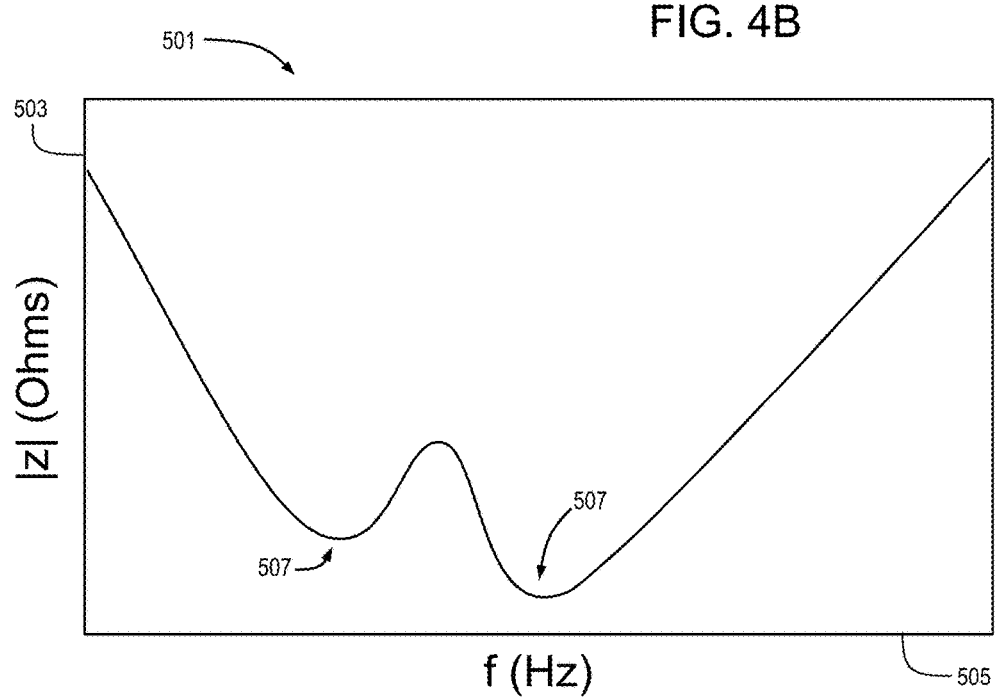
FIG. 5

ATTENUATION OF INDUCED MOTOR CURRENTS

INTRODUCTION

The subject disclosure relates to rotary electric machines.

Multi-phase AC machines are known to exhibit substantial induced currents within the machine structures. Induced currents within the machine structures may be undesirable. Therefore, it is desirable to reduce or eliminate induced currents through the machine bearings.

SUMMARY

In one exemplary embodiment, an alternating current (AC) motor system may include an AC motor including a rotor and a stator having multi-phase AC stator windings, a power inverter producing a multi-phase AC voltage, an AC bus coupled between the power inverter and the multi-phase AC stator windings, and an AC choke surrounding the AC bus.

In addition to one or more of the features described herein, the system may further include a grounding brush maintaining dynamic galvanic contact between a rotating surface of a rotor shaft and a grounding structure.

In addition to one or more of the features described herein, the system may further include an electrostatic shield between the multi-phase AC stator windings and the rotor.

In addition to one or more of the features described herein, the electrostatic shield between the multi-phase AC stator windings and the rotor may include a metallic layer attached to an inner diameter surface of the stator and surrounding the rotor.

In addition to one or more of the features described herein, the electrostatic shield between the multi-phase AC stator windings and the rotor may include thin metallic layers inserted between the multi-phase AC stator windings and the ends of adjacent teeth of the stator.

In addition to one or more of the features described herein, the electrostatic shield between the multi-phase AC stator windings and the rotor may include the ends of adjacent teeth of the stator overlapping between the multi-phase AC stator windings and the rotor.

In addition to one or more of the features described herein, the electrostatic shield between the multi-phase AC stator windings and the rotor may include bridges of stator metal between adjacent teeth of the stator between the multi-phase AC stator windings and the rotor.

In addition to one or more of the features described herein, the AC bus may include bus bars of the power inverter and the AC choke surrounds the bus bars.

In addition to one or more of the features described herein, the AC bus may include phase terminals of the AC stator windings and the AC choke surrounds the phase terminals.

In addition to one or more of the features described herein, the AC bus may include AC rods coupled between bus bars of the power inverter and phase terminals of the AC stator windings and the AC choke surrounds the AC rods.

In addition to one or more of the features described herein, the AC choke may have an effective bandwidth at least covering resonant frequencies of a capacitance between the AC stator windings and the stator or a frame of the AC motor.

In another exemplary embodiment, a method of attenuating induced currents in a multi-phase AC motor may include operating the multi-phase AC motor with an AC choke surrounding an AC bus providing multi-phase AC voltage to multi-phase AC stator windings in a stator, the AC choke may include an effective bandwidth at least covering resonant frequencies of a capacitance between the multi-phase AC stator windings and the stator or a frame of the AC motor.

In addition to one or more of the features described herein, the method may further include providing a grounding brush maintaining dynamic galvanic contact between a rotating surface of a shaft of a rotor and a grounding structure.

In addition to one or more of the features described herein, the method may further include providing an electrostatic shield between the multi-phase AC stator windings and the rotor.

In yet another exemplary embodiment, an electrified powertrain may include a battery pack, a traction power inverter module ("TPIM") connected to the battery pack, and configured to change a direct current ("DC") voltage from the battery pack to a multi-phase alternating current ("AC") voltage, a rotary electric machine energized by the multi-phase AC voltage from the TPIM over a multi-phase AC bus, the rotary electric machine including a stator having multi-phase AC stator windings, a rotor, a rotor shaft connected to and surrounded by the rotor and configured to rotate about an axis of rotation in conjunction with the rotor when the rotary electric machine is energized, and a transmission coupled to the rotor shaft and powered by the rotary electric machine, and an AC choke surrounding the multi-phase AC bus wherein the AC choke has an effective bandwidth at least covering resonant frequencies of a capacitance between the multi-phase AC stator windings and the stator or a frame of the rotary electric machine.

In addition to one or more of the features described herein, the powertrain may further include a grounding brush maintaining dynamic galvanic contact between a rotating surface of the rotor shaft and a grounding structure.

In addition to one or more of the features described herein, the powertrain may further include an electrostatic shield between the multi-phase AC stator windings and the rotor.

In addition to one or more of the features described herein, the multi-phase AC bus may include bus bars of the TPIM and the AC choke surrounds the bus bars.

In addition to one or more of the features described herein, the multi-phase AC bus may include phase terminals of the multi-phase AC stator windings and the AC choke surrounds the phase terminals.

In addition to one or more of the features described herein, the multi-phase AC bus may include AC rods coupled between bus bars of the TPIM and phase terminals of the multi-phase AC stator windings and the AC choke surrounds the AC rods.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIGS. 4A and 4B illustrate an AC choke and bus bars, in accordance with one or more embodiments;

FIG. 5 illustrates a plot of impedance versus frequency, in accordance with one or more embodiments.

DETAILED DESCRIPTION

Figure 1:
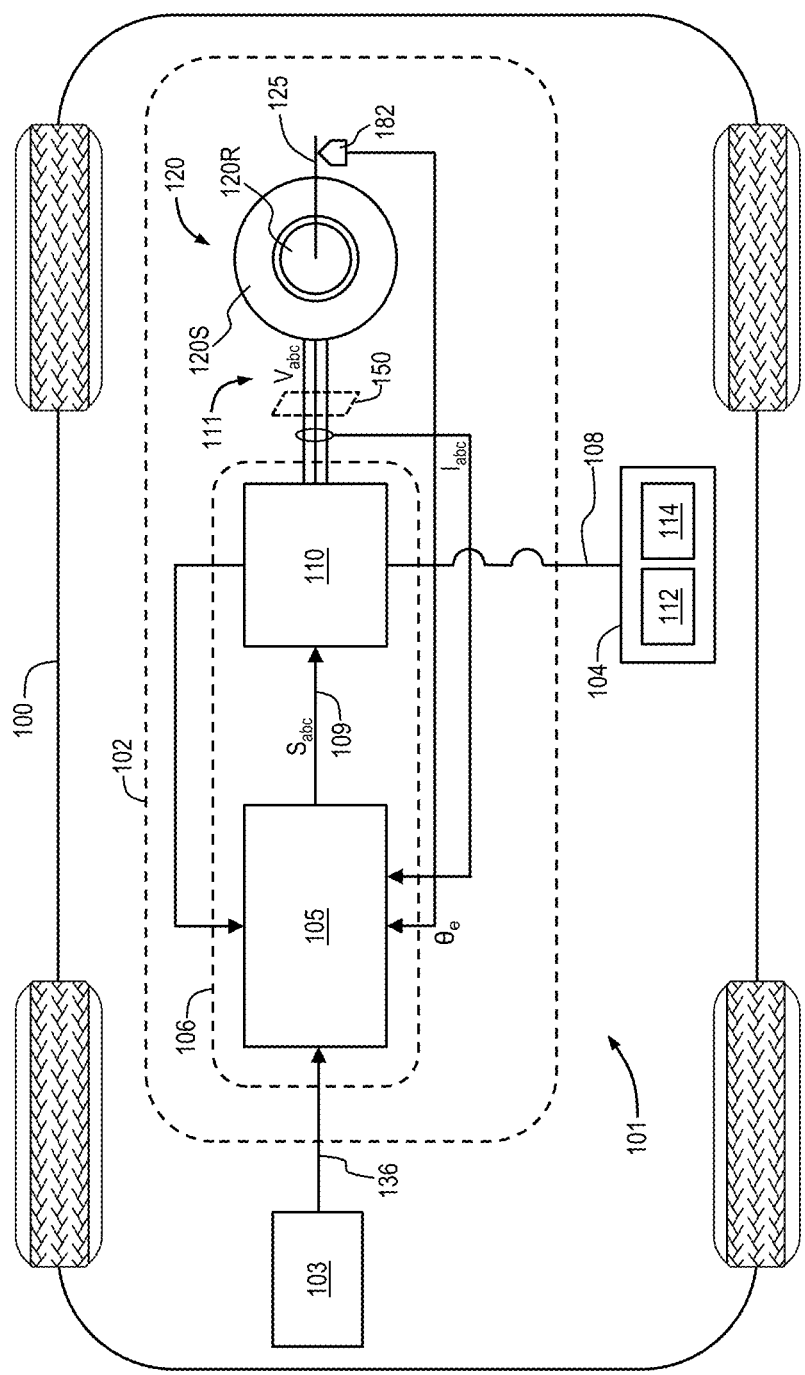
FIG. 1 illustrates an electric propulsion system on a vehicle, in accordance with one or more embodiments.

The following description is merely exemplary in nature and is not intended to limit the present disclosure, its application or uses. Throughout the drawings, corresponding reference numerals indicate like or corresponding parts and features.

FIG. 1 schematically illustrates an embodiment of an electric propulsion system 101 on a vehicle 100. Vehicle and vehicular are understood to refer to any means of transportation including non-limiting examples of motorcycles, cars, trucks, buses, excavation, earth moving, construction and farming equipment, railed vehicles like trains and trams, and watercraft like ships and boats. The electric propulsion system 101 may include various control components, electrical systems and electro-mechanical systems including, for example, a rechargeable energy storage system (RESS) 104 and an electric drive unit (EDU) 102. The electric propulsion system 101 may be employed on a powertrain system to generate propulsion torque as a replacement for, or in conjunction with, an internal combustion engine in various electric vehicle (EV) applications and hybrid electric vehicle (HEV) applications, respectively.

The EDU 102 may be of varying complexity, componentry and integration. An exemplary highly integrated EDU 102 may include, for example, a rotary electric machine such as an alternating current (AC) motor (motor) 120 and a traction power inverter module (TPIM) 106 including a motor controller 105 and a power inverter 110. The motor 120 may include a stator 120S and a rotor 120R coupled to a motor output shaft 125 and position sensor 182, for example a variable reluctance resolver or an encoder. The position sensor 182 may signally connect directly to the motor controller 105 and is employed to monitor angular position of the rotor ($\theta_e$) of the motor 120. The angular position of the rotor ($\theta_e$) of the motor 120 is employed by the motor controller 105 to control operation of the power inverter 110 that controls the motor 120.

The motor output shaft 125 may transfer torque between the motor 120 and driveline components (not illustrated), some of which may be integrated within the EDU 102, for example in a gearbox including reduction and differential gear sets and one or more axle outputs. The gearbox may simply include reduction gearing and a prop shaft output for coupling to a differential gear set. One or more axles may couple to the gear box directly or through final drive or differential gear sets if separate therefrom. Axle(s) may couple to a vehicle wheel(s) for transferring tractive force between a wheel and pavement. One having ordinary skill in the art will recognize alternative arrangements for driveline components. Propulsion torque requests or commands 136 ($T_{cmd}$) may be provided by a vehicle controller 103 to the motor controller 105.

Any controller may include one or more control modules. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

The RESS 104 may, in one embodiment, include one or more electro-chemical battery packs 112, for example high capacity, high voltage (HV) rechargeable lithium ion battery packs for providing power to the vehicle via a HV direct current (DC) bus 108. The RESS 104 may also include a battery manager module 114. The RESS 104 may include one or more battery packs 112 constructed from a plurality of battery pack modules allowing for flexibility in configurations and adaptation to application requirements. Battery packs may include a plurality of battery pack modules constructed from a plurality of cells allowing for flexibility in configurations and adaptation to application requirements. Battery pack modules may include a plurality of cells allowing for flexibility in configurations and adaptation to application requirements. For example, in vehicular uses, the RESS 104 may be modular to the extent that the number of battery pack modules may be varied to accommodate a desired energy density or range objective of a particular vehicle platform, intended use, or cost target. Battery packs and battery pack modules may be variously and selectively configured in accordance with desired propulsion architecture and charging functions. It is understood that the RESS 104 may be reconfigurable at any level of integration including battery pack, battery module and cell.

The motor 120 may be a multi-phase AC motor receiving multi-phase AC power over a multi-phase motor control power bus (AC bus) 111 which is coupled to the power inverter 110. In one embodiment, the motor 120 is a three-phase motor and the power inverter 110 is a three-phase inverter. The power inverter 110 may include a plurality of solid-state switches in a solid-state switching section. The power inverter 110 couples to DC power over the HV DC bus 108 (DC input voltage ($V_{dc}$)) from the RESS 104, for example at 400 or 800 volts. The motor controller 105 is coupled to the power inverter 110 for control thereof. The power inverter 110 electrically connects to stator phase windings of a three-phase stator winding of the motor 120 via the AC bus 111, with electric current ($I_{abc}$) monitored on two or three phases thereof. The power inverter 110 may be configured with suitable control circuits including paired power transistors (e.g., IGBTs) for transforming high-voltage DC voltage on the HV DC bus 108 to high-voltage three-phase AC voltage ($V_{abc}$) on the AC bus 111 and transforming high-voltage three-phase AC voltage ($V_{abc}$) on the AC bus 111 to high-voltage DC voltage on the HV DC bus 108. The power inverter 110 may employ any suitable pulse width modulation (PWM) control, for example sinusoidal pulse width modulation (SPWM) or space vector pulse width modulation (SVPWM), to generate switching vector signals ($S_{abc}$) 109 to convert stored DC electric power originating in the battery pack 112 of the RESS 104 to AC electric power to drive the motor 120 to generate torque. Similarly, the power inverter 110 may convert mechanical power transferred to the motor 120 to DC electric power to generate electric energy that is storable in the battery pack 112 of the RESS 104, including as part of a regenerative braking control strategy. The power inverter 110 may be configured to receive the switching vector signals ($S_{abc}$) 109 from motor controller 105 and control inverter states to provide the motor drive and regeneration functionality. Switching vector signals ($S_{abc}$) 109 may also be referred to herein as conduction commands.

Control of the power inverter 110 may include high frequency switching of the solid-state switches in accordance with the PWM control. A number of design and application considerations and limitations determine inverter switching frequency and PWM control. Inverter controls for AC motor applications may include fixed switching frequencies, for example switching frequencies around 10-30 kHz and PWM controls that minimize switching losses of the IGBTs or other power switches of the power inverter 110.

The disclosed improvements relate to a multi-phase AC motor 120, and may be realized in HEV and EV embodiments of the vehicle 100 without limitation, as well as in non-vehicular applications such as power plants, hoists, mobile platforms and robots, etc. The motor 120 may, for example, be an interior permanent magnet (IPM) machine, a permanent magnet synchronous reluctance (PMSR) machine, a synchronous reluctance (SR) machine, an induction machine, or any AC machine including a multi-phase AC stator 120S.

Figure 2A:
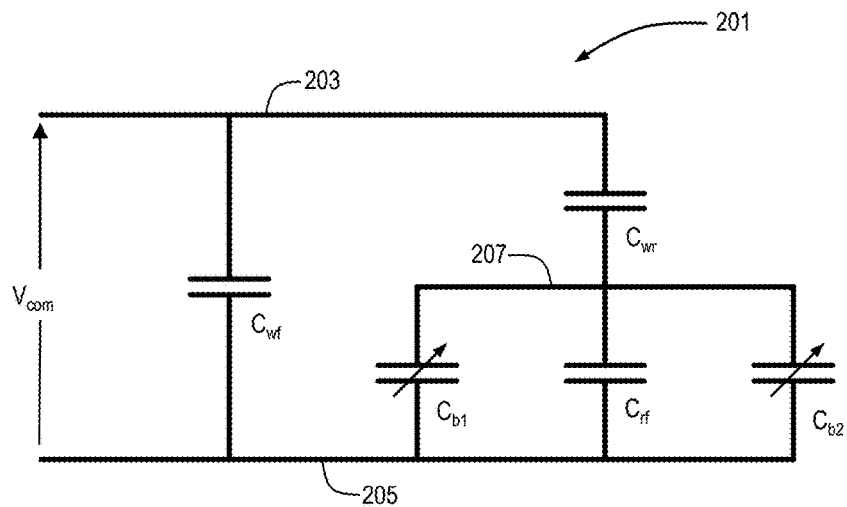
FIGS. 2A-2C illustrate models of a motor of the electric propulsion system, in accordance with one or more embodiments.
Figure 2B:
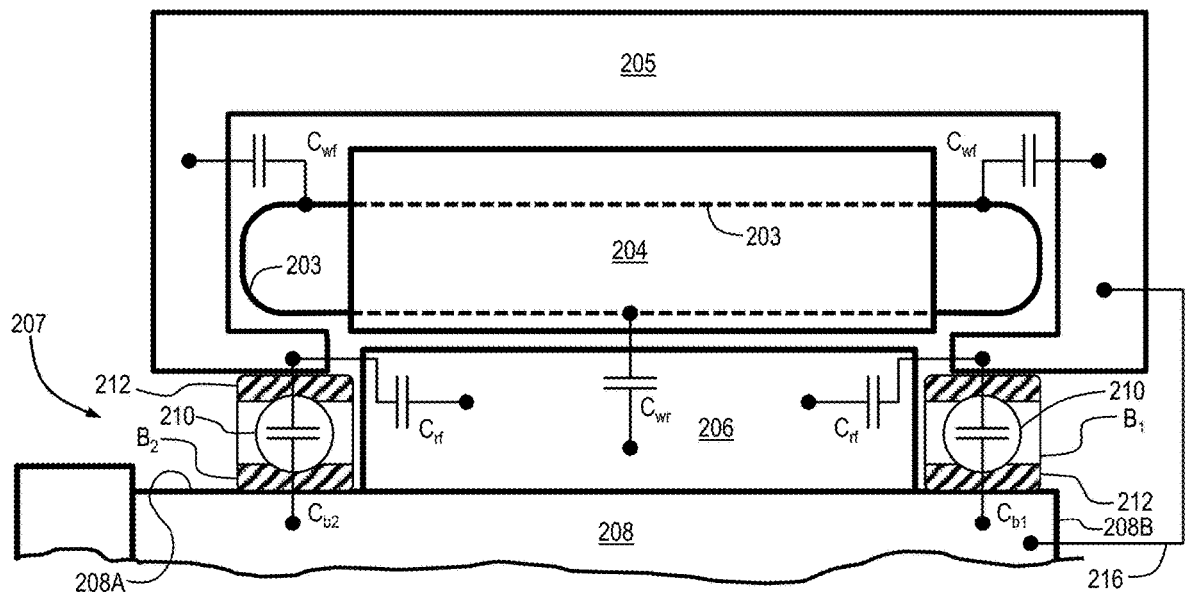
Figure 2C:
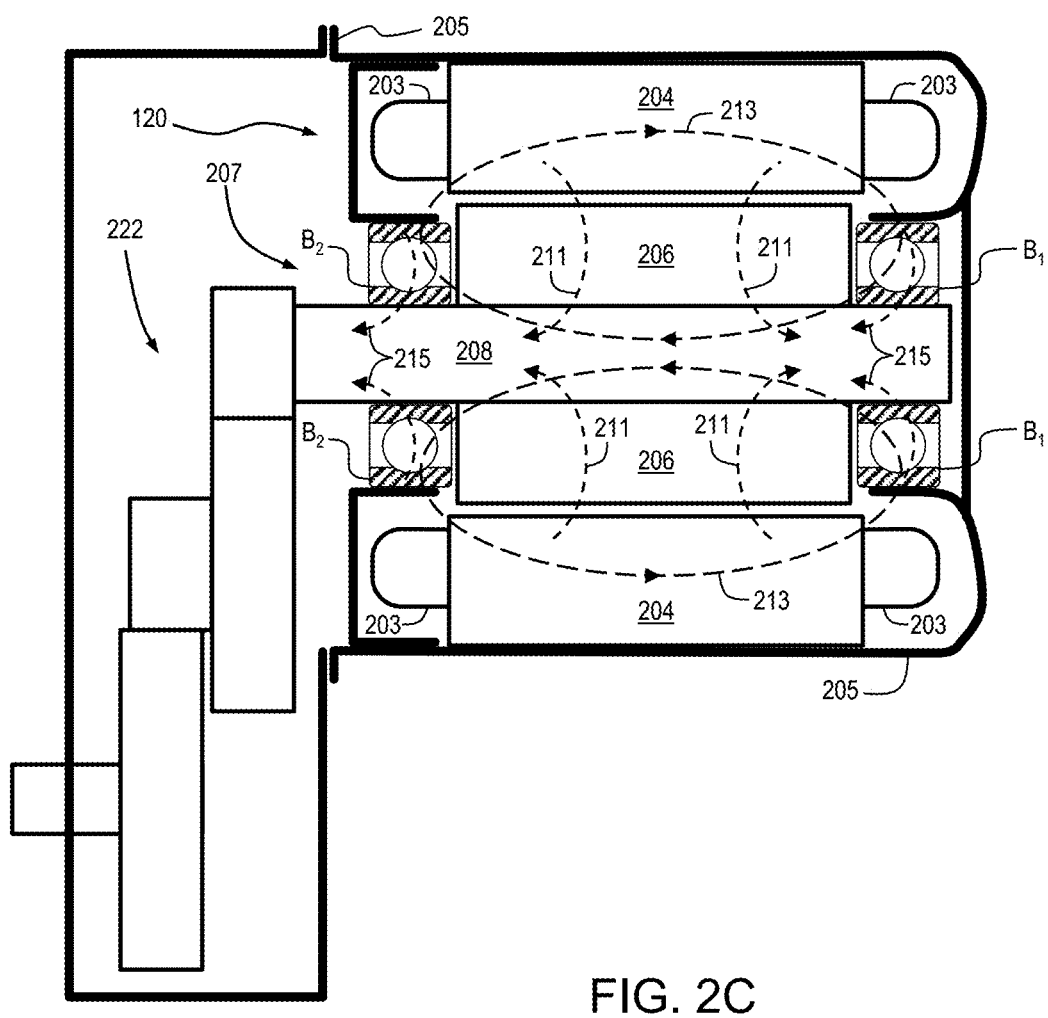

The power inverter 110 operates by synthesizing multi-phase AC voltages which are applied to corresponding phase windings of the multi-phase stator 120S of the motor 120 over the AC bus 111. In addition to the fundamental voltages output onto the AC bus 111, there may be parasitic excitations as a result of non-ideal waveforms. In a balanced three phase system, for example, the three fundamental AC voltages may be substantially sinusoidal and separated by 120 degrees. The summation of the three phase voltages would be equal to zero in an ideal system. However, the power inverter 110 operates by high frequency switching of a DC voltage to synthesize sinusoidal voltages over time. Instantaneous voltages on the AC bus 111 and at the stator phase windings may appear as square waveforms whose summations may not equal zero, thus resulting in high frequency excitations within the motor 120 manifesting in common mode voltages on the stator phase windings. A simplified model of the motor 120 is illustrated in FIGS. 2A, 2B and 2C and additional reference is made to those figures. FIGS. 2A and 2B model an impedance network 201 including a plurality of inherent machine parasitic capacitances "C" among major components and excitation voltages $V_{com}$. The impedance network 201 may include a winding to frame capacitance $C_{wf}$ from the stator windings 203 in the stator core 204 to the motor frame 205, a winding to rotor capacitance $C_{wr}$ from the stator windings 203 in the stator core 204 to the rotor core 206 and rotor shaft 208 of the rotor 207, a rotor to frame capacitance $C_{rf}$ from the rotor core 206 and rotor shaft 208 of the rotor 207 to the motor frame 205, and bearing impedances $C_{b1}$ and $C_{b2}$ from the rotor core 206 and rotor shaft 208 of the rotor 207 to the motor frame 205 through the bearing $B_1$ and $B_2$, respectively. This impedance network 201 may be excited by the common mode voltages ($V_{com}$) appearing on the AC bus 111 due to the power inverter 110 operation. The FIGS. 2A and 2B model corresponds to motor 120 having a pair of bearings $B_1$ and $B_2$ though additional bearings may be found in other embodiments. Bearings may include rolling elements 210 and race elements 212.

Various induced currents may be present in the power inverter 110 driven AC motor 120 and are illustrated by the FIG. 2C model of the motor 120. FIG. 2C additionally schematically illustrates an integrated gearset 222. Traditional capacitive currents 211 through the motor 120 may include low amplitude displacement currents through the bearing impedances $C_{b1}$ and $C_{b2}$ due to the voltage appearing on the rotor core 206 and rotor shaft 208 of the rotor 207 (between $C_{wr}$ and $C_{rf}$ in FIG. 2A). Ground currents 213 may flow between the stator windings 203 and motor frame 205 creating a circumferential flux through the motor 120 that induces a voltage across the rotor shaft 208 and results in circulating currents 213 flowing through the bearing impedances $C_{b1}$ and $C_{b2}$. As illustrated in FIG. 2C, the circulating currents may flow through the bearing $B_1$ and $B_2$ in opposite directions. Rotor ground currents 215 may flow through the bearing impedances $C_{b1}$ and $C_{b2}$ as stray currents if the impedance of the rotor 207 back to the inverter frame is lower than the stator core 204 back to the inverter frame. Such rotor ground currents 215 may not be significant in systems with short AC bus 111 cable runs, frame integrated inverters and shielded AC bus 111 cables. Electrical discharge machining (EDM) currents through the bearing $B_1$ and $B_2$ differ from the capacitive displacement currents as EDM currents are partial discharge currents within and through the bearings which may occur due to changes in the bearing impedance. Operating factors such as bearing load, speed and temperature may affect changes in the bearing impedance. Also, design factors such as sealed versus hydrodynamic effects of open, oil lubricated bearings may affect changes in the bearing impedance. Transient factors may also affect changes in the bearing impedance and may include rapid load increases, debris and vibration which may cause closing of the rolling element to race gap. Reductions in the bearing impedance may result in effective shorting of the bearings and undesirable discharge of the rotor voltage as EDM currents.

For the rotor ground currents 215 and circulating currents 213, the winding to frame capacitance $C_{wf}$ from the stator windings 203 in the stator core 204 to the motor frame 205 may be a major factor. Common mode currents, and hence the induced circulating currents 213, may be attenuated through the introduction of a filter in the form of an AC choke 150 operative upon the AC bus 111 as shown in FIG.

1. All phase conductors of the AC bus 111 are coupled to the AC choke 150 and hence the AC choke is effective upon the common mode currents. The addition of the AC choke 150 to the AC bus 111 may increase the impedance of the common mode path at select frequencies thereby attenuating the common mode currents and the downstream induced circulating currents.

Figure 3:
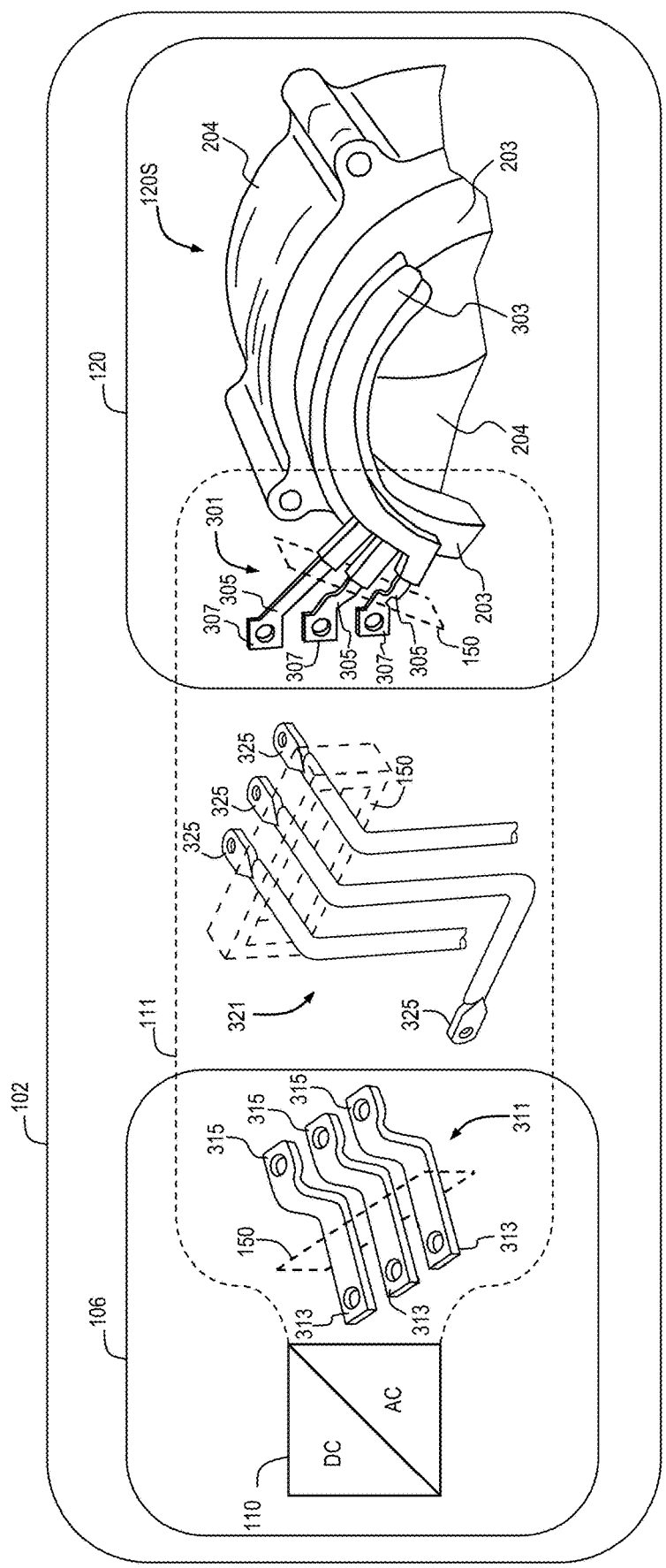
FIG. 3 illustrates an electric drive unit of the electric propulsion system, in accordance with one or more embodiments.

FIG. 3 illustrates the EDU 102 of FIG. 1 including alternate placement embodiments of the AC choke 150 upon the AC bus 111. The AC bus 111 runs between the TPIM 106 and the motor 120. The AC bus 111 provides conductive coupling of the multi-phase outputs of the power inverter 110 to the phase terminals 301 of the stator windings 203. The AC bus 111 may include AC bus features of the TPIM 106, AC bus features of the motor 120 and conductors connecting the AC bus features of the TPIM 106 and the AC bus features of the motor 120. In the three phase motor 120 there are three phase terminals 301, each of which includes a respective arcuately shaped stator bus bar 303 connected to respective phases of the stator windings 203 in the stator core 204. The stator bus bars 303 may include phase leads 305 which terminate at connecting pads 307. In the three phase TPIM 106 the power inverter 110 has three phase outputs (not illustrated) which may be coincident with a solid-state switching section of the power inverter 110. The phase outputs of the power inverter 110 are conductively coupled to one end of three bus bars 311 at respective connecting pads 313. The other end of the three bus bars 311 includes connecting pads 315 which may terminate at TPIM output terminals (not illustrated). In one embodiment, the three bus bars 311 may terminate at an intermediate point within the TPIM and connect to a second set of bus bars which terminate at the TPIM output terminals (not illustrated). The bus bars 311 may be formed from flat copper stock with a generally rectangular cross section and conduct the phase currents from the solid-state switching section of the power inverter 110 to TPIM output terminals (not illustrated). The bus bars 311 may be arranged in spaced adjacency side by side or in a stacked arrangement, in a single plane or multiple planes, oriented horizontally or vertically, or in any combination thereof for all or portions of the bus bars 311. The AC bus 111 may include AC rods 321 such as those illustrated in FIG. 3. Rods may have any suitable cross section and are illustrated in FIG. 3 with a round cross section with ends having flattened connecting pads 325 at either end. One end of the AC rods 321 may be connected to connecting pads 315 of the bus bars 311. The other end of the AC rods 321 may be connected to the connecting pads 307 of the stator bus bars 303 at the phase terminals 301 of the of the stator windings 203. Connections between bus bars 311 and the AC rods 321 and between the AC rods 321 and the phase terminals 301 may be any suitable connection such as bolt compression, clamping, soldering, welding or other metal joining, etc. Flexible conductors such as stranded or solid core cables may be used in place of or in addition to bus bars 311 or AC rods 321. As used herein, bus bars are understood to refer to AC bus 111 conductors associated with the power inverter 110 of the TPIM 106. As used herein, phase terminals 301 are understood to refer to AC bus 111 conductors associated with the stator windings 203 in the stator core 204 of the stator 120S of the motor 120. As used herein, AC rods 321 are understood to refer to conductors coupling between the bus bars 311 and the phase terminals 301. The AC choke 150 in FIG. 3 is illustrated in alternative placements surrounding the AC bus 111. Advantageously, the AC choke 150 being passive and independent of galvanic coupling for operation or control, affords flexibility in placement. Therefore, the AC choke 150 may be placed around the bus bars 311, around the AC rods 321 or around the phase terminals 301. In an embodiment, a single AC choke 150 may be placed in any suitable location surrounding the AC bus 111. In an embodiment, two or more AC chokes 150 may be placed at multiple locations surrounding the AC bus 111.

FIGS. 4A and 4B illustrate an embodiment of an AC choke 150 surrounding bus bars 311 between connecting pads 313 and connecting pads 315. The AC choke 150 surrounds a part of the bus bars 311 that are stacked in spaced adjacency thus allowing for a compact AC choke. FIG. 4B illustrates the AC choke 150 and the bus bars 311 in section taken along the line A-A in FIG. 4A. The AC choke 150 includes a core 401 illustrated shaded and a core cover 403 which may be an over molded plastic, polyurethane or similar insulator or dielectric material suitable for electrical isolation and mounting structure purposes. Sections through the bus bars are illustrated in crosshatch. The core 401 of the AC choke 150 has a mean length for the flux path shown by the closed dashed line 405.

With reference to FIG. 5, in one embodiment the common mode impedance characteristics of the stator windings 203 to the motor frame 205 may be developed through an empirically derived impedance plot 501 of impedance (|z|) in Ohms versus frequency (f) in Hz. In one embodiment, impedance may be measured between the stator core 204 and the stator windings 203 as a substantial equivalent of the impedance between the motor frame 205 and stator windings 203 since the motor frame 205 and stator core may be galvanically coupled in an operative installation. Since common mode impedance implicates all phases of the stator windings 203, the phase leads 305 of the stator bus bars 303 are shorted together during impedance measurements. A frequency swept voltage signal may be applied across the shorted phase leads 305 of the stator bus bars 303 and the stator core 204 and impedance measurements recorded. An exemplary plot of such impedance measurements versus frequency is illustrated in FIG. 5 wherein relative impedance |z| is plotted along the vertical axis 503 and relative frequency f is plotted along the horizontal axis 505. Local minimum impedances 507 may correspond to relatively high values of the winding to frame capacitance $C_{wf}$ from the stator windings 203 in the stator core 204 to the motor frame 205 and frequencies correspond to strong resonant behavior of the impedance network 201 of the motor 120 and correspondingly high bearing currents. Thus, these local low impedance resonant frequencies of the winding to frame capacitance $C_{wf}$ are desirably addressed by the filtering effects of the AC choke 150 applied to the AC bus 111. Therefore, the AC choke 150 is desirably specified with a bandwidth that covers the highest resonant winding to frame impedance frequency observed. As used herein, bandwidth that covers the highest resonant winding to frame impedance frequency means an effective signal attenuation at the highest resonant winding to frame impedance frequency of at least 3 decibels (dB).

The inductance of the AC choke 150 is the mechanism by which the AC choke 150 attenuates the undesirable common mode currents and may be defined by the material (permeability vs. frequency), its saturation limit and geometry (i.e., section through the core 401, mean length of the flux path 405 through core 401). The size of the core 401 affects the saturation limit of the AC choke 150 which when reached drops the inductance significantly thus negatively affecting the effectiveness in suppressing the common mode currents. Core 401 materials are generally characterized by permeability vs. frequency and a design objective for the AC choke 150 may be to have sufficient permeability to avoid saturation at the highest resonant frequency observed in the impedance plot 501. Exemplary core 401 materials and construction may include ferrites or ferromagnetic powder and binders. In an embodiment, the core 401 may be constructed from wound ribbons (e.g., iron-based nanocrystalline alloy ribbons) to achieve permeability and high saturation limits over a wide frequency range. In an embodiment, a ferrite core may be formed from a powder metal (sintered or molded with binder) and may be a single piece or multiple pieces. The AC choke 150 design may be determined experimentally by directly measuring the bearing currents in an operable set up and through design of experiments with a range of AC choke 150 size parameters (mass, cross sectional area, effective mean length, etc.). Bearing currents may be determined through instrumented bearings that are isolated and jumpered to bypass the bearing current allowing for measurement. Operationally equivalent AC chokes 150 may be objectively evaluated relative to such decision factors as mass, packaging volume and cost. Operational equivalence may refer to bearing current reduction to some arbitrary target level, for example. Thus, an AC choke 150 may be specified for use surrounding the AC bus 111 for effectiveness as well as in consideration of design and cost parameters.

An AC choke 150 surrounding the AC bus 111 as described herein may effectively reduce the circulating currents which are displacement currents through the bearings and reduce the opportunity for harmful discharges through the bearings as EDM currents as described herein. However, while the AC choke 150 effective in such a manner to attenuate the common mode currents inducing such circulating parasitic currents, the high frequency switching dv/dt from the power inverter and the voltages that appear at the phase terminals are not affected by the common mode attenuating effect of the AC choke 150. Thus, the voltages at the phase winding may result in charge accumulating or building up on the rotor 207 and sustained voltage at the rotor shaft 208 which may reach a critical level and result in EDM currents through the bearings.

In an embodiment, positive galvanic discharge path may be employed to provide a discharge path from the rotor shaft 208 to the motor frame 205 and is labeled 215 schematically in FIG. 2B at one end of the rotor shaft 208 though discharge paths may be located at either or both ends of the rotor shaft 208. In an embodiment, the discharge path may be a grounding brush such as a spring loaded graphite brush similar to commutator brushes in DC motors, anti-dust rings having conductive micro-fibers, sacrificial bearings, or other positive galvanic discharge path between the rotor shaft 208 and the motor frame. As used herein, grounding brush is understood to refer to any suitable galvanic discharge path 215 maintaining dynamic galvanic contact between a rotating surface of the rotor shaft 208 and the motor frame, the stator core 204, or other suitable grounding structure. In an embodiment, the grounding brush may be in dynamic galvanic contact with the radially outer surface 208A of the rotor shaft 208. In one embodiment, the grounding brush may be in dynamic galvanic contact with an end surface 208B of the rotor shaft 208.

Figure 6:
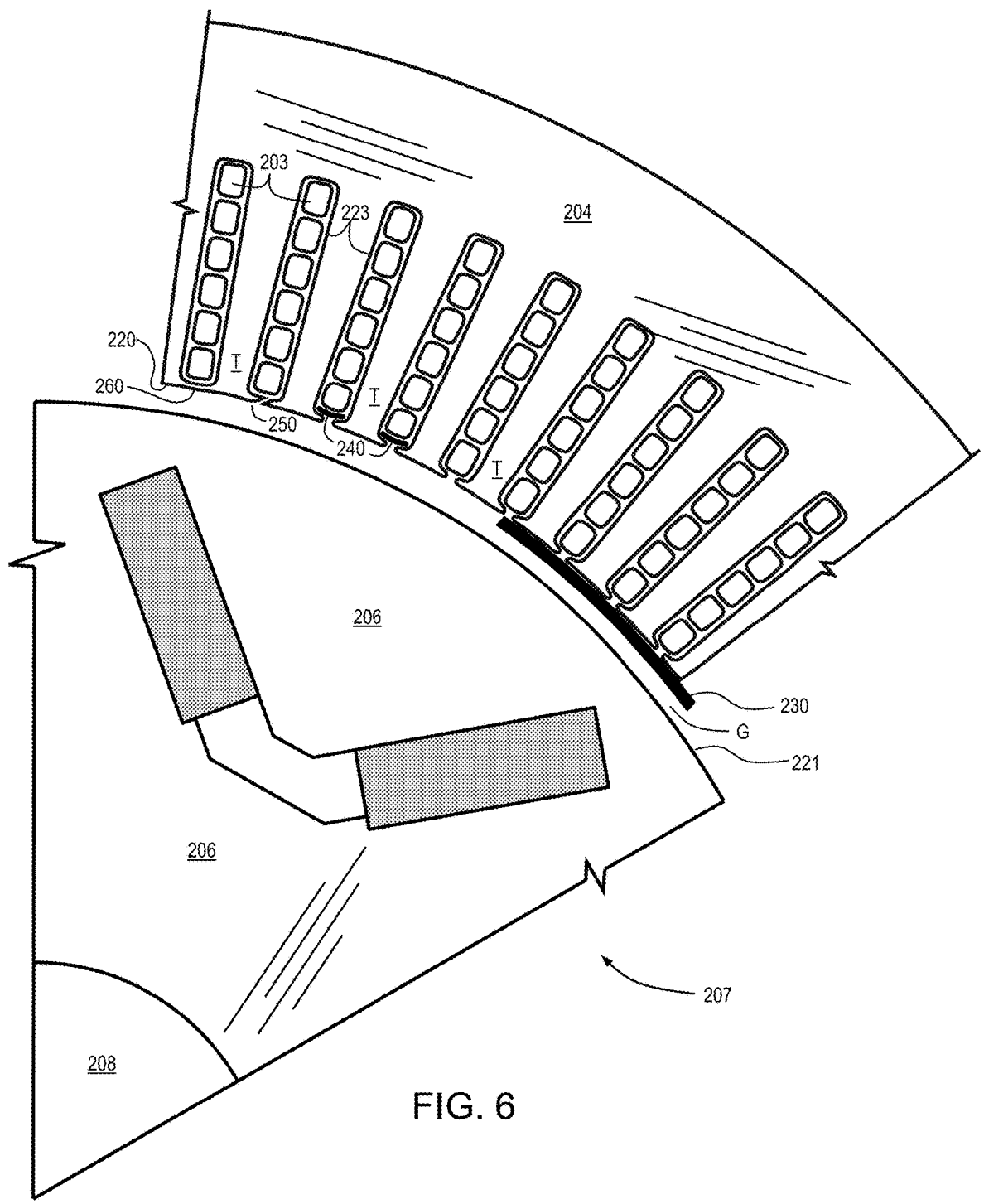
FIG. 6 illustrates a partial sectional view of a rotor and stator, in accordance with one or more embodiments.

In an embodiment, the winding to rotor capacitance $C_{wr}$ from the stator windings 203 in the stator core 204 to the rotor core 206 and rotor shaft 208 of the rotor 207 may be reduced to effect a larger voltage drop across the winding to rotor capacitance $C_{wr}$ and a smaller voltage drop across the equivalent capacitance of the parallel combination of the rotor to frame capacitance $C_{rf}$ from the rotor core 206 and rotor shaft 208 of the rotor 207 to the motor frame 205 and the bearing impedances $C_{b1}$ and $C_{b2}$ from the rotor core 206 and rotor shaft 208 of the rotor 207 to the motor frame 205 through the bearing $B_1$ and $B_2$, respectively. FIG. 6 illustrates a partial sectional view of a rotor and stator of a multi-phase AC motor showing various embodiments of features effecting a reduction of the winding to rotor capacitance $C_{wr}$. FIG. 6 depicts a portion of the rotor 207, including the rotor core 206 and rotor shaft 208, and a portion of the stator including the stator core 204 proximate thereto.

The stator has radially-projecting stator teeth T extending inward from the cylindrical stator core 204. That is, the stator teeth T extend toward the rotor 207 from the stator core 204. The inner diameter surface 220 of the stator is the radially-innermost surface of the stator teeth T facing or opposing the outer diameter surface 221 of the rotor 207 in spaced adjacency to form the air gap G which is dimensionally exaggerated for clarity. Adjacent stator teeth T are separated from each other by a corresponding stator slot 223. The stator slots 223 enclose electrical conductors, typically copper wires or copper bars/"hairpins". Such conductors collectively form the stator windings 203.

The stator windings 203 may be electrostatically shielded from the rotor core 206 effective to reduce of the winding to rotor capacitance $C_{wr}$ from that of unshielded stator windings 203. In an embodiment illustrated in FIG. 6 an electrostatic shield may be a thin metallic layer 230 attached to the inner diameter surface 220 of the stator 207 (i.e., the radially-innermost surface of the stator teeth T) and surrounding the entire rotor. The thin metallic layer 230 is illustrated with a thickness that is dimensionally exaggerated for clarity. The thin metallic layer 230 would completely circumscribe the rotor core 206 but only a small section is illustrated for clarity. In an embodiment illustrated in FIG. 6 the shield may be thin metallic layers 240 inserted between the stator windings 203 and the ends of adjacent stator teeth T. The thin metallic layer 240 is illustrated with a thickness that is dimensionally exaggerated for clarity. The thin metallic layer 240 would be placed within each stator slot 223 of the stator 207 but only a small section is illustrated for clarity. In an embodiment illustrated in FIG. 6 the shield may be the ends of adjacent teeth T on either side of a stator slot 223 being formed to overlap or bypass 250 thereby providing an effective shield of the stator windings 203. The overlap 250 may be gapped appropriately for insertion of stator windings 230 for a wound stator 207. All teeth T would be formed with an overlap 250 but only one stator slot 223 is illustrated with such an overlap 250 for clarity. In an embodiment illustrated in FIG. 6 the shield may be bridges 260 of the stator metal closing the slots 223 at the ends of the teeth T. A closed stator slot 223 may be appropriate in stator embodiments using longitudinally inserted stator windings 203. The bridges 260 would be formed between all teeth T at each stator slot 223 of the stator 207 but only one stator slot 223 is illustrated with such a bridge 260 for clarity.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An alternating current (AC) motor system, comprising:
   an AC motor including a rotor and a stator having multi-phase AC stator windings;
   a power inverter producing a multi-phase AC voltage;
   an AC bus coupled between the power inverter and the multi-phase AC stator windings; and
   an AC choke surrounding the AC bus,
   wherein the AC bus comprises AC rods coupled between bus bars of the power inverter and phase terminals of the AC stator windings and the AC choke surrounds the AC rods.

2. The AC motor system of claim 1 further comprising a grounding brush maintaining dynamic galvanic contact between a rotating surface of a rotor shaft and a grounding structure.

3. The AC motor system of claim 1 further comprising an electrostatic shield between the multi-phase AC stator windings and the rotor.

4. The AC motor system of claim 1 wherein the AC bus comprises the bus bars of the power inverter.

5. The AC motor system of claim 1 wherein the AC bus comprises the phase terminals of the AC stator windings and the AC choke surrounds the phase terminals.

6. The AC motor system of claim 1 wherein the AC choke has an effective bandwidth at least covering resonant frequencies of a capacitance between the AC stator windings and the stator or a frame of the AC motor.

7. The AC motor system of claim 3 wherein the electrostatic shield between the multi-phase AC stator windings and the rotor comprises a metallic layer attached to an inner diameter surface of the stator and surrounding the rotor.

8. The AC motor system of claim 3 wherein the electrostatic shield between the multi-phase AC stator windings and the rotor comprises thin metallic layers inserted between the multi-phase AC stator windings and ends of adjacent teeth of the stator.

9. The AC motor system of claim 3 wherein the electrostatic shield between the multi-phase AC stator windings and the rotor comprises ends of adjacent teeth of the stator overlapping between the multi-phase AC stator windings and the rotor.

10. The AC motor system of claim 3 wherein the electrostatic shield between the multi-phase AC stator windings and the rotor comprises bridges of stator metal between adjacent teeth of the stator between the multi-phase AC stator windings and the rotor.

11. A method of attenuating induced currents in a multi-phase AC motor, comprising:
    operating the multi-phase AC motor with an AC choke surrounding an AC bus providing multi-phase AC voltage to multi-phase AC stator windings in a stator, the AC choke comprising an effective bandwidth at least covering resonant frequencies of a capacitance between the multi-phase AC stator windings and the stator or a frame of the AC motor, the AC bus comprising AC rods coupled between bus bars of the power inverter and phase terminals of the AC stator windings and the AC choke surrounds the AC rods.

12. The method of attenuating induced currents in a multi-phase AC motor of claim 11, further comprising providing a grounding brush maintaining dynamic galvanic contact between a rotating surface of a shaft of a rotor and a grounding structure.

13. The method of attenuating induced currents in a multi-phase AC motor of claim 12, further comprising providing an electrostatic shield between the multi-phase AC stator windings and the rotor.

14. An electrified powertrain, comprising:
    a battery pack;
    a traction power inverter module ("TPIM") connected to the battery pack, and configured to change a direct current ("DC") voltage from the battery pack to a multi-phase alternating current ("AC") voltage;
    a rotary electric machine energized by the multi-phase AC voltage from the TPIM over a multi-phase AC bus, and comprising:
        a stator having multi-phase AC stator windings;
        a rotor;
        a rotor shaft connected to and surrounded by the rotor, and configured to rotate about an axis of rotation in conjunction with the rotor when the rotary electric machine is energized;
        a transmission coupled to the rotor shaft and powered by the rotary electric machine; and
        an AC choke surrounding the multi-phase AC bus wherein the AC choke has an effective bandwidth at least covering resonant frequencies of a capacitance between the multi-phase AC stator windings and the stator or a frame of the rotary electric machine.

15. The electrified powertrain of claim 14 further comprising a grounding brush maintaining dynamic galvanic contact between a rotating surface of the rotor shaft and a grounding structure.

16. The electrified powertrain of claim 14 further comprising an electrostatic shield between the multi-phase AC stator windings and the rotor.

17. The electrified powertrain of claim 14 wherein the multi-phase AC bus comprises bus bars of the TPIM and the AC choke surrounds the bus bars.

18. The electrified powertrain of claim 14 wherein the multi-phase AC bus comprises phase terminals of the multi-phase AC stator windings and the AC choke surrounds the phase terminals.

19. The electrified powertrain of claim 14 wherein the multi-phase AC bus comprises AC rods coupled between bus bars of the TPIM and phase terminals of the multi-phase AC stator windings and the AC choke surrounds the AC rods.

20. The electrified powertrain of claim 14 wherein the AC choke comprises a core having a mean length for a flux path through the core.

* * * * *